US008543682B2

(12) United States Patent
Menon (10) Patent No.: US 8,543,682 B2
(45) Date of Patent: Sep. 24, 2013

(54) QUALITY OF EXPERIENCE INDICATOR FOR NETWORK DIAGNOSIS

(75) Inventor: Jyotikumar Menon, Germantown, MD (US)

(73) Assignee: Spirent Communications, Inc., Santa Clara, CA (US)

( * ) Notice: Subject to any disclaimer, the term of this patent is extended or adjusted under 35 U.S.C. 154(b) by 465 days.

(21) Appl. No.: 11/743,565

(22) Filed: May 2, 2007

(65) Prior Publication Data

US 2008/0276001 A1 Nov. 6, 2008

(51) Int. Cl.
*G06F 15/16* (2006.01)
*G06F 15/173* (2006.01)

(52) U.S. Cl.
USPC .......................................... 709/224; 709/217

(58) Field of Classification Search
USPC ......................................... 709/224, 230–237
See application file for complete search history.

(56) References Cited

U.S. PATENT DOCUMENTS

| 6,574,213 | B1 * | 6/2003 | Anandakumar et al. ....... 370/338 |
|---|---|---|---|
| 7,080,161 | B2 * | 7/2006 | Leddy et al. .................. 709/219 |
| 7,085,268 | B2 * | 8/2006 | Fukuda et al. ................ 370/389 |
| 2002/0075857 | A1 * | 6/2002 | LeBlanc ....................... 370/352 |
| 2002/0136164 | A1 * | 9/2002 | Fukuda et al. ............... 370/230 |
| 2002/0194361 | A1 * | 12/2002 | Itoh et al. ..................... 709/233 |
| 2003/0115320 | A1 * | 6/2003 | Yarroll et al. ................ 709/224 |
| 2003/0145076 | A1 * | 7/2003 | Procopio et al. ............. 709/224 |
| 2003/0145077 | A1 * | 7/2003 | Khan et al. ................... 709/224 |

FOREIGN PATENT DOCUMENTS

| WO | 2006/024698 A1 | 3/2006 |
|---|---|---|
| WO | 2007/071076 A1 | 6/2007 |

* cited by examiner

*Primary Examiner* — Ian N Moore
*Assistant Examiner* — Jenee Alexander
(74) *Attorney, Agent, or Firm* — Haynes Beffel & Wolfeld LLP; Ernest J. Beffel, Jr.

(57) ABSTRACT

A method, system and computer program product for calculating a scaled quality indicator expressing a quality of experience for streaming media, includes calculating network characteristics of packet loss rate of the streaming media, calculating network characteristics of packet jitter of the streaming media, and calculating the scaled quality indicator based on the calculated packet loss rate and the calculated packet jitter.

7 Claims, 6 Drawing Sheets

FIG. 6

# QUALITY OF EXPERIENCE INDICATOR FOR NETWORK DIAGNOSIS

FIELD OF THE INVENTION

This invention is related in general to the field of quality testing of streaming media transmission over the internet. More particularly, the invention is related to a method and system for computing a scaled quality of experience indicator based on calculated media packet loss and media packet jitter characteristics.

BACKGROUND OF THE INVENTION

The telecommunication networks of today ubiquitously deliver streaming media in the form of voice, video and data over a converged infrastructure. These different types of streaming media require differing network characteristics for guaranteed end-to-end delivery. Quality of service (QoS) mechanisms need to be implemented in the network infrastructure to ensure that each type of streaming media is treated in the most appropriate way.

The consumers of streaming media are not concerned about the complex mechanisms implemented in the network infrastructure to guarantee media delivery, but rather they are only concerned about the quality experienced in the usage of these media streams. Hence, there is a need to ensure that the testing of the network infrastructure include mechanisms to subjectively evaluate the consumer's quality of experience. The different types of streaming media have varying levels of tolerance to the network characteristics of media packet loss and variation in the inter-arrival time of media packets characterized as jitter. This leads to different levels of quality of experience for these types of streaming media based on varying network characteristics.

SUMMARY OF THE INVENTION

An aspect of the present invention relates to a method of characterizing a quality of experience of streaming media as a scaled quality indicator based on network characteristics of media packet loss and media jitter.

Another aspect of the present invention relates to a system for characterizing a quality of experience of a streaming media as a scaled quality indicator based on network characteristics of media packet loss and media jitter.

Yet another aspect of the present invention relates to providing a scaled quality indicator characterization of a streaming media quality of experience, which will help in better diagnosing and fixing problems in a network infrastructure for guaranteeing end-to-end delivery of different types of streaming media. The scaled quality of experience indicator is calculated based on packet loss rate and inter-arrival jitter of the streaming media.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION

Reference will now be made in detail to embodiments of the invention, examples of which are illustrated in the accompanying drawings. An effort has been made to use the same reference numbers throughout the drawings to refer to the same or like parts.

A packet loss is calculated according to the first embodiment of the invention, whereby the packet loss is a one-way packet loss from a source of a streaming media to a recipient of the streaming media. Packet loss is an important influencer of the quality of experience of streaming media due to the following reasons:

The performance of certain client-server applications degrades rapidly relative to increasing packet loss between client and server.

Excessive packet loss can render certain real-time applications to be completely ineffective.

Increasing packet loss reduces the ability of transport layer protocols like TCP to sustain high bandwidths due to excessive retransmissions.

The sensitivity of the transport layer protocols and real-time applications to packet loss is increased exponentially on large delay-bandwidth product links, e.g., satellite links.

The following reasons detail the necessity of the calculation of one-way packet loss instead of the round-trip or two-way packet loss:

The proportion of the downstream traffic is very large in a streaming media application as compared to the upstream traffic which corresponds mostly to relatively small control packets.

In today's communications networks based on IP (Internet Protocol) the path traversed by each data packet could be different in the upstream and downstream direction. Hence, the use of round-trip measurements actually measure the performance of two different paths together, which may make it difficult to pinpoint a packet transfer problem that exists between a source and a recipient. For example, one-way packet loss measurements highlight the performance differences between the two paths (upstream and downstream) which may traverse different Internet Service Providers and even radically different types of network, e.g., SONET vs ATM.

Even if the two paths are symmetric, the performance characteristics on the two paths might be different due to asymmetric queuing algorithms employed in the routers and switches along each path, whereby a two-way loss calculation scheme would not be able to pinpoint this problem with respect to whether it occurs on the upstream path or the downstream path.

Figure 1:
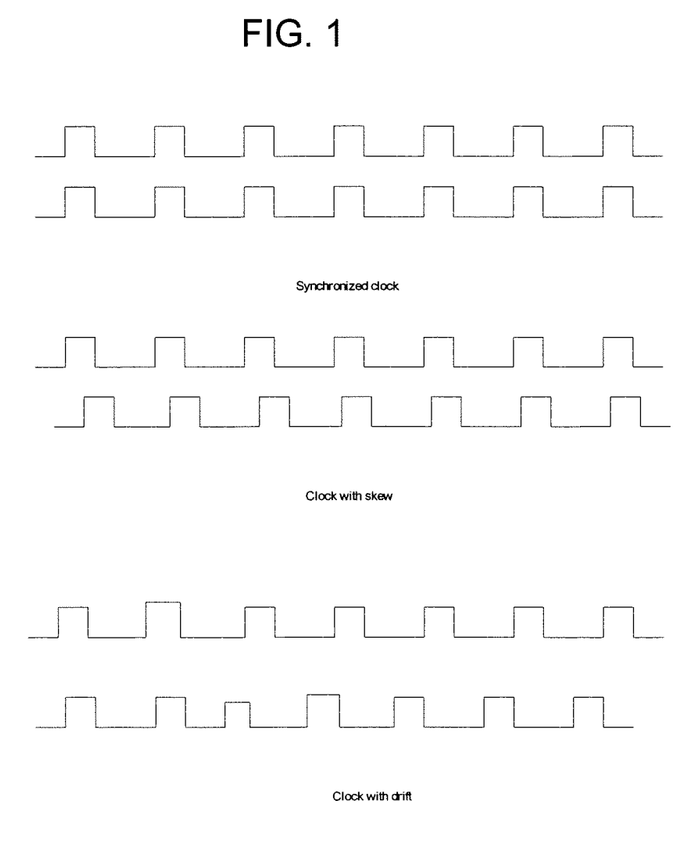
FIG. 1 shows clocks that are synchronized, skewed, or drifted with respect to each other, to show clock certainty and uncertainty.

The measurement of packet loss entails the use of time specified by clocks. Referring now to FIG. 1, there are four important notions related to clock uncertainty:

Synchronization

This measures the alignment of the time measurement on different hosts in the network. The first two clocks in FIG. 1 are shown as being synchronized with each other.

Accuracy

This measures the alignment of the time measurement on a specific host with UTC.

Resolution

This measures the precision scale of the time measurement on a specific host.

Skew

This measures the progressive change of accuracy of a given time measurement with the passage of time. This also measures the progressive change of synchronization between the time measurement on different hosts with the passage of time. The third and fourth clocks in FIG. 1 are shown as being skewed in time with respect to each other, and the fifth and sixth clocks in FIG. 1 are shown as having drift with respect to each other. Hence, these third through sixth clocks are unsynchronized.

The following assumptions are applicable to the packet loss calculation according to the first embodiment of the invention:

Packet arriving with delay exceeding a defined upper bound is calculated as a lost packet. The upper bound is dependent on network characteristics.

Packet arriving with data corruption is calculated as a lost packet.

Duplicate receipt of non-corrupted packets is not calculated as a lost packet.

Fragmented packets that cannot be re-assembled due to non-receipt of some fragments is calculated as a lost packet.

The above-discussed four sources of clock uncertainty have been eliminated.

The streaming media packets are sent at a constant bit rate from the source to the destination.

Figure 2:
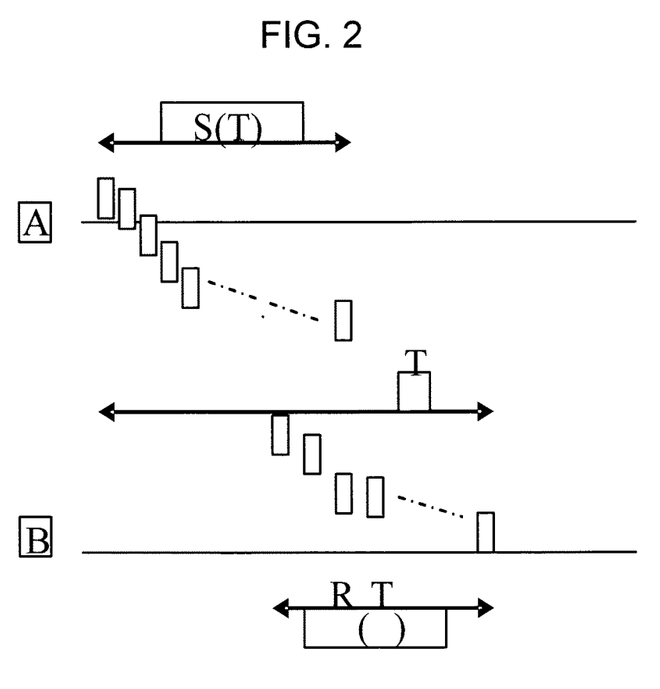
FIG. 2 is a diagram showing a bit stream between a source and a recipient, for use in explaining the mathematical basis of packet loss in accordance with the first embodiment.

The mathematical basis of packet loss rate calculation in accordance with the first embodiment of the invention is provided below, with reference to FIG. 2.

Consider a stream of packets flowing from point A to point B.

Consider that the number of packets sent from A during time interval T is S(T). Consider that the number of packets received at B during the same time interval T is R(T).

The Packet Loss Rate ($\pi$) for the time interval T can be represented as $$\pi(T)=\{S(T)-R(T)\}/\{S(T)*T\}$$

Figure 3:
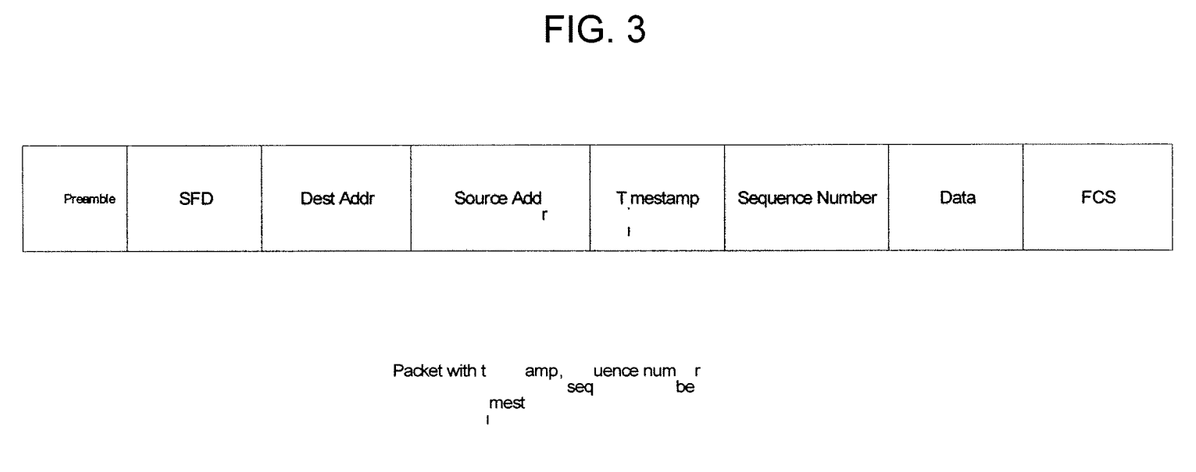
FIG. 3 is a diagram showing a packet with a timestamp field and a sequence number field, for use in explaining the mathematical basis of packet loss rate calculation and packet jitter calculation in accordance with the first embodiment.

The methodology of packet loss rate calculation is described below, with reference to FIG. 3.

Each packet of the streaming media sent from the source to the destination has a monotonically increasing sequence number (provided in a sequence number field in that packet).

Each packet of the streaming media sent from the source to the destination have a timestamp (provided in a timestamp field in that packet).

Since the packets of the streaming media are sent at a constant bit rate, the expected number of packets per second is calculated. Packets arriving with out-of-order sequence numbers are also counted as lost.

The difference between the expected number of packets to the actual number of packets received per second is the loss.

The loss rate is the ratio of the loss to the packets sent multiplied by the time interval of the streaming media.

The calculation of packet jitter according to the first embodiment is described herein.

The maximum packet jitter for the streaming media is used for the sizing of play-out buffers for applications requiring the regular delivery of packets like voice or video decoding.

Packet jitter is also used to determine the size of interface queues within routers in a packet network.

Packet jitter metric is not affected by the differences and variations of the clocks of the two hosts. This allows the use of the metric even if the two hosts are not clock synchronized.

Figure 4:
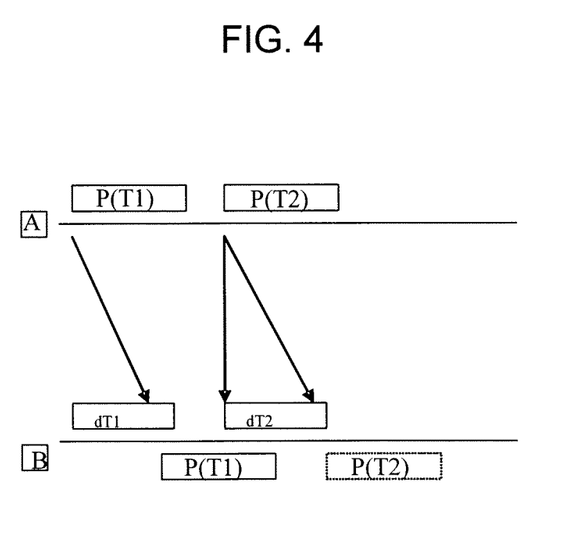
FIG. 4 is a diagram showing packet jitter between a source and a recipient, for use in explaining the mathematical basis of packet jitter calculation in accordance with the first embodiment.

The mathematical basis of packet jitter calculation in accordance with the first embodiment of the invention is provided below, with reference to FIG. 4.

Consider a stream of packets flowing from point A to point B.

Consider a packet P(T1) whose first bit leaves A at time T1.

Consider a second packet P(T2) whose first bit leaves A at time T2.

Consider that the last bit of packet P(T1) was received at B at time T1+σT1.

Consider that the last bit of packet P(T2) was received at B at time T2+σT2.

The packet jitter for this stream is defined as $$\zeta(T)=\sigma T2-\sigma T1$$

The following issues are considered for the packet jitter measurement in accordance with the first embodiment of the invention:

Since this is a differential measurement it is less sensitive to clock synchronization between the source and destination of the stream.

Understanding of packet lifetimes for different streaming media is important for the jitter calculation to determine the difference between a large delay and an infinite delay.

The value of the jitter depends on properties of the packet for e.g. protocol used (e.g., TCP or UDP), size of the packet, and type of service (TOS) of the packet.

Duplicate packets are handled by considering the one-way delay of the first copy.

If the packet is fragmented at the source and not all fragments are received at the destination then the packet is counted as lost.

The methodology of packet jitter calculation is described below, with reference to FIG. 3.

Create test packets of a given size with given source and destination IP addresses.

A timestamp and sequence number is added to the test packet before sending it to the destination.

At the destination, the timestamp and sequence number of the packet reception is noted. The difference between the two timestamps is an estimate of the one-way delay between the source and destination.

Repeat the above process for the second packet. The difference between the first one-way delay value and the second one-way delay value is the estimate of packet jitter for the pair of packets.

Continue this process for the length of testing period. At the end of the testing period, the minimum, maximum and the average values of packet jitter are noted (e.g., stored in a memory).

The following factors affect the accuracy of the packet jitter measurement that is made in accordance with the first embodiment:

Clock synchronization errors between the source and destination contribute to errors in both the delay measurements.

The effect of skew on the delay measurements can be quantified as follows:

The skew function is approximated to be linear in time. The error function imposed by skew can be represented as $\epsilon(t)=\alpha*t+\Theta$ {$\alpha$ is a constant and $\Theta$ is the offset at time $0$}

The error added to the difference of the delay measurements then becomes $$\epsilon(T2)-\epsilon(T1)=\alpha*(T2-T1)\{T2>T1\},$$

which gets added to the time difference (T2−T1).

If the drift is factored into the calculation and approximated to be a linear function of time the skew can be represented as:

$Z(t)=\beta*(t^2)+\gamma*(t)+Z0$ where $\beta$, $\gamma$ are constants Z0 is skew at time $0$.

The error added by the combination of skew and drift will be $$\epsilon(t)=Z(t)+O$$

The error added to the difference in delay measurements then becomes $$\epsilon(T2)-\epsilon(T1)=\beta*\{(T2-T1)^2\}+\gamma*(T2-T1)$$

The values of packet loss rate and packet jitter are used in the first embodiment to derive the quality of experience indicator as follows:

Determine the maximum packet loss rate M derived from the streaming media characteristics for e.g. media rate, compression ratio etc.

Determine the minimum packet loss rate m derived from the streaming media characteristics.

Determine the maximum packet jitter J derived from the streaming media characteristics.

The scaled quality of experience indicator is represented as follows:

$\Omega=1.0$ for $\pi(T)$ greater than $M$ $\Omega=2.0$ for $\pi(T)$ greater than $m$ and less than $M$ $\Omega=3.0$ for $\zeta(T)$ greater than $J$ $\Omega=4.0+\{1-\{\pi(T)*T\}\}*\lambda$ where $\lambda$ is derived from the streaming media characteristics.

In the first embodiment, a scaling factor is utilized to provide a quality measure to a user, referred to herein as a Quality of Experience Indicator. In one possible implantation of the first embodiment, a five-point scaling factor of 1.0 to 5.0 is used to represent the quality of experience of the streaming media using a single number. The quality of experience values that this five-point scaling factor represents is as follows:

Excellent=5
Good=4
Fair=3
Poor=2
Bad=1

As can be observed from the values that the five-point scaling factor represents, a single point of reference for the quality of experience is provided to the user, whereby the user can make a qualified judgment about the streaming media without the use of decoding and playback of the streaming media using more expensive equipment.

An example of usage of Quality of Experience Indicator for network diagnosis according to the first embodiment is described herein, to assist in understanding of the present invention. The scaled quality of experience indicator can be used for diagnosing problems in a network as follows:

If the scaled quality of experience indicator indicates a value of 1 for a stream of media packets flowing from A to B, this indicates to the network operator that the characteristics of the network do not permit the usage of the particular streaming media. This can be remedied by using the individual components of the scaled quality of experience indicator, namely the packet loss rate and the packet jitter, and mitigating the debilitating effects that the characteristics of the network impose on these components. Here, the cost to quality tradeoff will likely be very high.

If the scaled quality of experience indicator indicates a value of 2 for a stream of media packets flowing from A to B, this indicates to the network operator that the characteristics of the network do not permit the usage of the particular streaming media. This can be remedied by using the individual components of the scaled quality of experience indicator, namely the packet loss rate and the packet jitter, and mitigating the debilitating effects that the characteristics of the network impose on these components. Here, the cost to quality tradeoff will likely be medium.

If the scaled quality of experience indicator indicates a value of 3 for a stream of media packets flowing from A to B, this indicates to the network operator that the characteristics of the network do not permit the usage of the particular streaming media. This can be remedied by using the individual components of the scaled quality of experience indicator, namely the packet loss rate and the packet jitter, and mitigating the debilitating effects that the characteristics of the network impose on these components. Here, the cost to quality tradeoff will likely be low.

If the scaled quality of experience indicator indicates a value of 4 for a stream of media packets flowing from A to B, this indicates to the network operator that the characteristics of the network permit the usage of the particular streaming media. Mitigating the effects of packet loss rate and packet jitter can improve the quality of experience with a very low cost tradeoff.

If the scaled quality of experience indicator indicates a value of 5 for a stream of media packets flowing from A to B, this indicates to the network operator that the characteristics of the network is ideally suited for the usage of the particular streaming media.

The debilitating effects of packet loss rate can be mitigated as follows:

If the packet loss rate is higher than the threshold of tolerance for the streaming media application, this can be reduced by determining the causes of the packet loss. The following are some of the causes of packet loss in the network:

Misconfiguration of routers and switches in the network.

Small interface queue sizes of routers and switches in the network.

Low bandwidth availability for the particular streaming media application.

Loss induced as a result of traversing certain transmission media.

The loss caused by misconfiguration can be remedied by correcting the configuration.

The loss induced by interface queue sizes can be remedied by increasing the Dynamic Random Access Memory (DRAM) in the routers and switches.

The loss induced due to bandwidth can be remedied by using network protocols like MPLS that can guarantee bandwidth based on the streaming media application.

The loss induced as a result of traversing the streaming media can be remedied by using optical transmission media which have low bit error rate (BER).

The debilitating effects of packet jitter can be mitigated as follows:

If the packet jitter is higher than the threshold of tolerance for the streaming media application, this can be reduced by determining the causes of the packet jitter. The following are some of the causes of packet jitter in the network:

Misconfiguration of routers and switches in the network.

Small interface queue sizes of routers and switches in the network.

Low bandwidth availability for the particular streaming media application.

The jitter caused by misconfiguration can be remedied by correcting the configuration.

The jitter induced by interface queue sizes can be remedied by increasing the DRAM memory in the routers and switches.

The jitter induced due to bandwidth can be remedied by using network protocols like Multi-Protocol Label Switching (MPLS) that can guarantee bandwidth based on the streaming media application.

The effects of jitter can also be eliminating by appropriately sizing the de-jitter buffers in the hosts, decoding and playing back the streaming media application.

Figure 5:
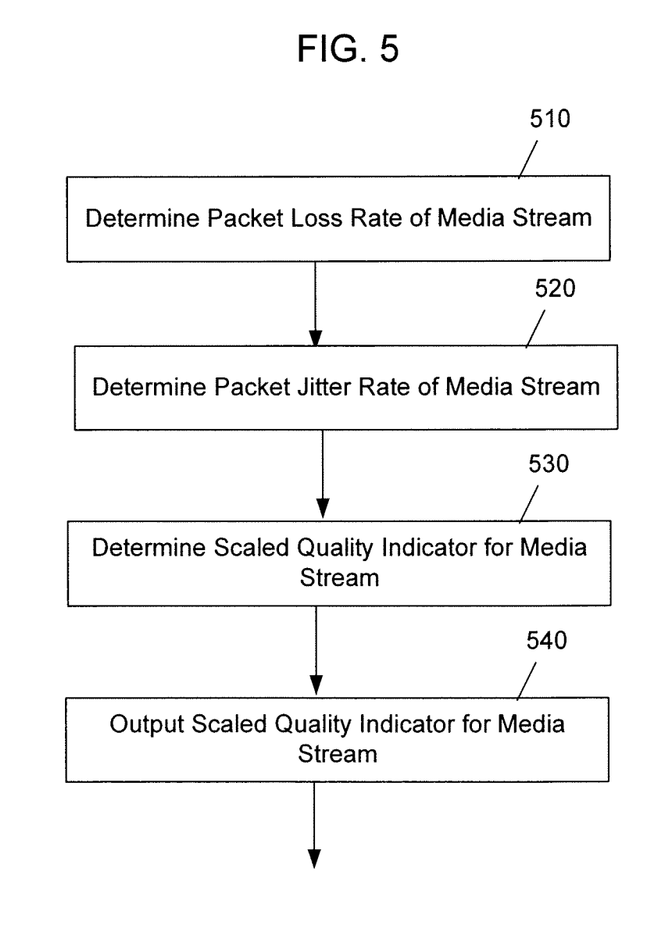
FIG. 5 is a flow chart showing steps involved in computing a scaled quality indicator in accordance with the first embodiment.

A method of calculating a scaled quality indicator expressing a quality of experience for streaming media according to the first embodiment of the invention will be described below, with reference to FIG. 5. The method includes a first step 510 of calculating network characteristics of packet loss rate of the streaming media. The method also includes a second step 520 of calculating network characteristics of packet jitter of the streaming media. The method further includes a third step 530 of calculating the scaled quality indicator based on the calculated packet loss rate and the calculated packet jitter. The method still further includes a fourth step 540 of outputting the scaled quality indicator, whereby a user can then evaluate a network based on that output value.

Figure 6:
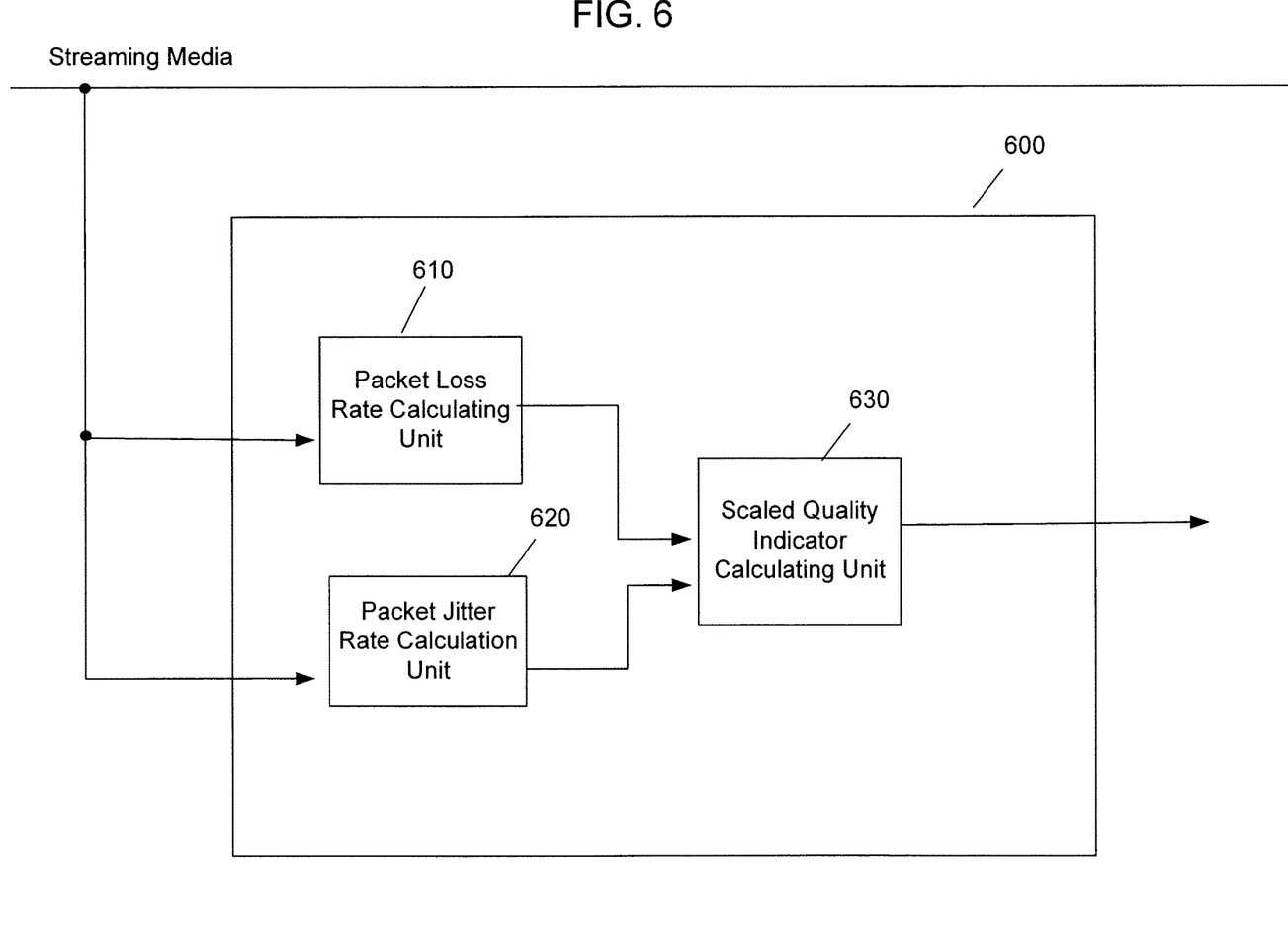
FIG. 6 is a block diagram showing components utilized in computing a scaled quality indicator in accordance with the first embodiment.

An apparatus 600 according to the first embodiment is described below, with reference to FIG. 6. The apparatus 600 includes a packet loss rate calculating unit 610 that calculates network characteristics of packet loss rate of the streaming media. As explained above, this may be done by using the equation $\pi(T) = \{S(T) - R(T)\}/\{S(T)*T\}$. The apparatus 600 also includes a packet jitter rate calculation unit 620 for calculating network characteristics of packet jitter of the streaming media. As explained above, this may be done by using the equation $\zeta(T) = \sigma T2 - \sigma T1$. The error added to the difference in delay measurements due to clock skew and clock drift, represented as $\epsilon(T2) - \epsilon(T1) = \beta*\{(T2-T1)^2\} + \gamma*$ (T2−T1) is taken into account for the packet jitter calculation. The apparatus 600 further includes a scaled quality indicator calculating unit 630 for calculating a scaled quality indicator based on the calculated packet loss rate and the calculated packet jitter with the representative formula in paragraph 0027 above. The scaled quality indicator is output to a user, whereby the user can then evaluate a network based on that output value.

The embodiments described above have been set forth herein for the purpose of illustration. This description, however, should not be deemed to be a limitation on the scope of the invention. For example, while a 5-point scaling factor has been described with respect to the first embodiment, one of ordinary skill in the art will recognize that a different numbered scaling factor may be utilized for the first embodiment, while remaining within the spirit and scope of the invention has described above. Various modifications, adaptations, and alternatives may occur to one skilled in the art without departing from the claimed inventive concept. The spirit and scope of the invention are indicated by the following claims.

What is claimed is:

1. A method of calculating a scaled quality indicator expressing a quality of experience for streaming audio and/or video media, comprising:

calculating, by a diagnostic device, packet loss rate of streaming audio and/or video media;

calculating, by the diagnostic device, packet jitter of the streaming media;

calculating and reporting to a user, by the diagnostic device, a scaled quality of user experience indicator, including:

comparing the calculated packet loss rate to a plurality of packet loss rate thresholds for a particular bit rate of the streaming media and comparing the calculated packet jitter to a plurality of jitter thresholds for a particular bit rate of the media stream corresponding to the streaming media, first applying the calculated loss rate and then applying the calculated packet jitter when the calculated loss rate is better than a lower loss rate threshold.

2. The method according to claim 1, further including, when calculating the scaled quality of user experience indicator, comparing the calculated packet jitter to a plurality of jitter thresholds for a particular bit rate of the media stream corresponding to the streaming media, wherein the plurality of jitter thresholds include a minimum jitter threshold and a maximum jitter threshold.

3. The method according to claim 1, wherein the scaled indicator is set to a first integer value when the calculated packet loss rate of the streaming media exceeds a maximum packet loss rate, wherein the scaled quality of experience indicator is set to a second integer value greater than the first integer value when the calculated packet loss rate of the streaming media is less than or equal to the maximum packet loss rate and is also greater than a minimum packet loss rate, wherein the scaled quality of experience indicator is set to a third integer value greater than the second integer value when the calculated packet jitter rate of the streaming media exceeds a maximum packet jitter rate.

4. A system for calculating a scaled quality indicator expressing a quality of experience for streaming media, comprising:

a first calculating unit that calculates packet loss rate of the streaming audio and/or video media;

a second calculating unit that calculates packet jitter of the streaming media;

a third calculating unit that calculates and reports a scaled quality of user experience indicator, wherein the scaled indicator combines evaluation of at least the calculated packet loss rate and the calculated packet jitter, first applying the calculated loss rate by comparing the calculated packet loss rate to the plurality of packet loss rate thresholds for a particular bit rate of the media stream corresponding to the streaming media and then applying the calculated packet jitter when the calculated loss rate is better than a lower loss rate threshold by comparing the calculated packet loss rate to the plurality of packet loss rate thresholds for a particular bit rate of the media stream corresponding to the streaming media.

5. The system according to claim 4, wherein the scaled indicator is set to a first integer value when the calculated packet loss rate of the streaming media exceeds a maximum packet loss rate, wherein the scaled quality of experience indicator is set to a second integer value greater than the first integer value when the calculated packet loss rate of the streaming media is less than or equal to the maximum packet loss rate and is also greater than a minimum packet loss rate, wherein the scaled quality of experience indicator is set to a third integer value greater than the second integer value when the calculated packet jitter rate of the streaming media exceeds a maximum packet jitter rate.

6. A non-transitory computer readable storage medium executable by a computer to calculate a scaled quality indicator expressing a quality of experience for streaming media, the non-transitory computer readable storage medium causing the computer to perform the steps of:

calculating network characteristics of packet loss rate of the streaming media;

calculating network characteristics of packet jitter of the streaming media; and calculating and reporting to a user a scaled quality of user experience indicator, comparing the calculated packet loss rate to a plurality of packet loss rate thresholds for a particular bit rate of the streaming media and comparing the calculated packet jitter to a plurality of jitter thresholds for a particular bit rate of the media stream corresponding to the streaming media, first applying the calculated loss rate and then applying the calculated packet jitter when the calculated loss rate is better than a lower loss rate threshold.

7. The non-transitory computer readable storage medium according to claim 6, wherein the scaled indicator is set to a first integer value when the calculated packet loss rate of the streaming media exceeds a maximum packet loss rate, wherein the scaled quality of experience indicator is set to a second integer value greater than the first integer value when the calculated packet loss rate of the streaming media is less than or equal to the maximum packet loss rate and is also greater than a minimum packet loss rate, wherein the scaled quality of experience indicator is set to a third integer value greater than the second integer value when the calculated packet jitter rate of the streaming media exceeds a maximum packet jitter rate.

* * * * *